United States Patent [19]

Ohshita et al.

[11] Patent Number: 4,960,057
[45] Date of Patent: Oct. 2, 1990

[54] METHOD OF INCINERATING COMBUSTIBLES BY USING FLUIDIZED BED

[75] Inventors: Takahiro Ohshita; Tsutomu Higo; Yukio Mizoguchi, all of Kanagawa, Japan

[73] Assignee: Ebara Corporation, Tokyo, Japan

[21] Appl. No.: 265,849

[22] PCT Filed: Feb. 13, 1987

[86] PCT No.: PCT/JP87/00095
§ 371 Date: Aug. 5, 1988
§ 102(e) Date: Aug. 5, 1988

[87] PCT Pub. No.: WO87/05089
PCT Pub. Date: Aug. 27, 1987

[30] Foreign Application Priority Data

Feb. 14, 1986 [JP] Japan ................................ 61-28777
Mar. 11, 1986 [JP] Japan ................................ 61-51551
May 23, 1986 [JP] Japan ............................. 61-117507
Jun. 24, 1986 [JP] Japan ............................. 61-146006

[51] Int. Cl.$^5$ .......................... F23G 5/30; F23G 7/00
[52] U.S. Cl. ................................. 110/345; 110/245; 110/346; 110/342; 110/343
[58] Field of Search ............... 110/245, 342, 343, 346, 110/345

[56] References Cited

U.S. PATENT DOCUMENTS

| | | | |
|---|---|---|---|
| 3,888,193 | 6/1975 | Kishigami et al. | 110/245 |
| 3,907,674 | 9/1975 | Roberts et al. | 110/215 X |
| 3,916,805 | 11/1975 | Kalfadelis et al. | 110/345 |
| 3,921,543 | 11/1975 | Menigat et al. | 110/345 |

FOREIGN PATENT DOCUMENTS

| | | |
|---|---|---|
| 3482 | 1/1974 | Japan . |
| 33699 | 9/1974 | Japan . |
| 31091 | 3/1979 | Japan . |
| 138804 | 8/1984 | Japan . |

OTHER PUBLICATIONS

Wall, C. J.; Graves, J. T.; Roberts, E. J.; How to Burn Salty Sludges, Apr. 14, 1975, *Chemical Engineering* pp. 77-82.

Mullins et al., 13th Australian Chemical Engineering Conference, Perth, Paper A5B, Aug. 25 to 28, 1985.

*Primary Examiner*—Henry A. Bennet
*Assistant Examiner*—C. B. Kilner
*Attorney, Agent, or Firm*—Wenderoth, Lind & Ponack

[57] ABSTRACT

A method of incinerating all kinds of wastes such as municipal waste, waste plastics, industrial waste, various kinds of waste slurries and waste liquid, etc. or fuels such as coal, oil cokes and bark, etc. using a fluidized bed type incinerator which employs a granular material as a fluidizing medium, said granular material comprising $TiO_2$ or $Al_2O_3$, particularly anatase-type $TiO_2$ or $\alpha$-$Al_2O_3$, as the primary component thereof.

8 Claims, 4 Drawing Sheets

METHOD OF INCINERATING COMBUSTIBLES BY USING FLUIDIZED BED

FIELD OF INVENTION

The present invention relates to a method of incinerating all types of waste such as municipal waste, waste plastics, industrial waste, various kinds of waste slurries, waste liquid, etc. and all fuels such as coal, petroleum coke, bark, etc. (these wastes and fuels being referred to as "combustibles") by using a fluidized bed type incinerator wherein a grain material comprising $TiO_2$ or $Al_2O_3$ as its primary component is employed as a fluidizing medium.

BACKGROUND OF INVENTION

During the period in which the saving of resources has been eagerly discussed following the so-called 2nd Oil Crisis, many new technologies such as melting or heat decomposing furnaces and the technology for recycling plastic from waste plastic with the aim of resource recovery have been widely developed.

However, the reduction process employed in the melting furnace, heat decomposing furnace or the like has involved the consumption of several times the amount of energy which may be recovered thereby and, thus, the reduction process required more than three or four times the expense of the incinerating process in a conventional incinerator and its stable operation has been found to be difficult. The above reduction process has, thus, in fact, resulted in failure and many enterprises have ceased their efforts in this direction.

Further, in cases where the recycling of waste plastic is performed, it is difficult to sort the waste plastic since the many kinds of waste plastics are mixed together and, therefore, the recycled plastic contains a mixture of many kinds of plastics whereby the recycled plastic cannot be used in a manner similar to that in which fresh plastic material is used except in the case of making relatively low grade goods. Also, there is another problem in that harmful substances are contained in the plastic, such as heavy metals including stabilizing agents and pigments, etc. and, therefore, the usage of recovered plastic has been limited to the manufacture of goods such as stakes and flower pots which need not necessarily be made of plastic, and so the manufacturing thereof is, in fact, expensive and unprofitable.

Further, if the waste plastic is used for reclamation, since it is bulky because of its low specific gravity, and also since its volume does not reduce due to its relatively stable characteristics which tend to inhibit decomposition, it is difficult for the waste plastic to be effectively disposed of in reclamation.

As noted above, there have been difficulties in recycling waste plastic and disposing of the same such as in reclamation, etc. and there has thus been no suitable way of disposing of these waste plastics. It has therefore been desired to find a good solution for disposing of waste plastics and determining the proper pre-sorting requirement for collecting waste plastics which has been problematic for the workers concerned with garbage disposal in local government.

In some municipalities, waste plastics have been sorted out as being improper for incineration since some kinds of plastics will generate high temperatures which may damage a furnace if subjected to incineration in a mechanical furnace or the like such as a stoker. However, it is difficult to completely sort out plastics from the inflammable municipal waste and it is inevitable that a certain amount of plastic will remain in the waste after sorting, at least say 10% thereof.

Particularly in the case where vinyl chloride or the like is incinerated hydrogen chloride is generated which is apt to corrode metals and concrete, etc., thereby not only damaging the furnace or smoke stack but also becoming the cause for pollution. Great expense and effort has therefore been required in the disposal of the discharged gas generated by the incineration of vinyl chloride, etc.

In November, 1983, it was announced that the generation of harmful dioxin had been detected in the mechanical stoker type of incinerator and such announcement caused social unrest. The generation of organic chloride compositions such as polydioxin chloride (PCDD), polydibenzofuran chloride (PCDF) and benzpyrene, etc. give rise to a big controversy relating to the incinerating process and the main cause of the generation of harmful substances is regarded as lying in the existence of waste plastics. Thereafter, many research institutes have conducted studies on analyzing methods and effects on health but many unsolved matters remain regarding dioxin, etc. and the mechanisms whereby dioxins are generated and decomposed have not yet become clear.

However, according to the following equation [1],

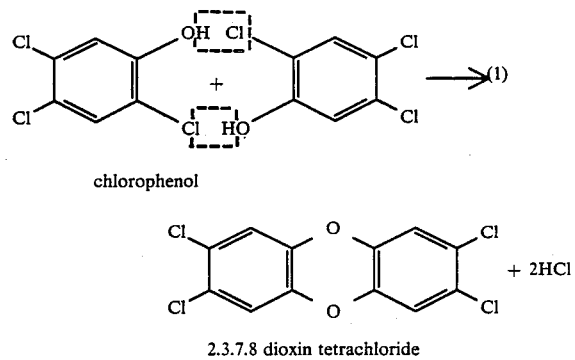

chlorophenol 2.3.7.8 dioxin tetrachloride it is known that dioxin is generated by a de-hydrochloric acid reaction when a chlorophenol is heated to around 300–700° C.

There are many mixtures in municipal waste, namely, plastics such as vinyl chloride, etc., various kinds of dyes, and chlorobenzene such as insect repellent. It is presumed that, when these many organic chemical substances are incinerated, a part thereof may become chlorophenol which causes the generation of dioxins. Accordingly, it has been desired to provide a non-polluting process for incinerating waste without producing such harmful substances as noted above.

It is said that dioxins are generally produced at a temperature below 700° C. and they are completely decomposed by an oxidization process at approximately 900–1200° C. Therefore, there are two processes for preventing the generation of dioxins, one being a decomposition process wherein the dioxin generated at the low temperature zone in the lower portion of an incinerator is decomposed by oxidization at 900–1200° C. in a free-board of the upper portion of the incinerator, and the other being a high temperature process for completely preventing the generation of dioxins by constantly maintaining the temperature of the lower part of the incinerator at over 700° C. (preferably over 800° C. from the viewpoint of possible temperature variations and with a view to keeping the operating temperature at a safe level).

In cases where the furnace or incinerator is a mechanical type, it is only possible, due to its incineration mechanism, to employ the former process and the interior of the waste piled on a stoker at the bottom of the furnace is in the calcining state at 300–400° C. corresponding to the range wherein dioxins are generated to the greatest extent. Further, a combustion air ratio in the mechanical furnace is as high as more than 2 and, therefore, the cooling rate by air therein is relatively high and, thus, it is difficult to raise the temperature at the upper portion of the incinerator to 900–1200° C. unless the exothermic calory level of the waste to be burnt is relatively high.

For this reason incineration by using a fluidized bed was conceived. In the case where a fluidized bed type incinerator is employed, a fluidized bed comprising a fluidizing medium such as silica sand is formed at the bottom of the incinerator and this bed is usually operated at around 700° C. Therefore, a process using such a fluidized bed is considered to be preferable in this regard compared to a process using a mechanical furnace. However, a complex chemical reaction zone exists within the fluidized bed in a fluidized bed type incinerator and it cannot be guaranteed, even with the use of this fluidized bed type incinerator, that generation of dioxins or the like will be effectively prevented at temperatures of approximately 700° C. Therefore, it is advantageous to operate such an incinerator by further raising the temperature of the fluidized bed (preferably to over 800° C.) while maintaining the temperature of the free-board at around 900–1200° C. because the generation of organic chloride compounds such as dioxins is prevented with certainty, as well as the fact that other harmful substances such as PCB and cyan, etc. are almost completely decomposed at temperatures around 1200° C.

On the other hand, disposal of industrial waste and various kinds of waste slurries, etc. that have been discharged from factories for reclamation purposes is becoming difficult and it has recently become a gradually growing trend to incinerate such wastes. Specifically, a fluidized bed type incinerator that can completely dispose of several kinds of wastes is becoming widely used and attempts are being made to incinerate waste that contains compounds of alkaline metals in the fluidized bed (of these incinerators).

However, a fluidized bed type incinerator commonly used for incinerating waste employs as a fluidizing medium silica sand ($SiO_2$) having a mean grain size in the range between approximately 0.4 and 2.0 mm and incinerates the waste with thermal energy being added thereto together with the assistance of fuel, if necessary, the incineration taking place within a fluidized bed formed by the medium while the bed temperature is maintained at approximately 700° C., and the thermal energy generated by the incineration being returned to the fluidizing medium. However, the silica sand which represents the fluidizing medium reacts with the alkaline-metal compounds, etc. as noted below and produces water glass, i.e. sodium silicate ($Na_2O.3SiO_2$), which makes it impossible for the medium to be fluidized. It has therefore been the practice to limit the temperature of the fluidized bed in accordance with the kinds of object waste to be incinerated.

$$3SiO_2 + Na_2CO_3 \rightarrow Na_2O.3SiO_2 + CO_2$$

$$3SiO_2 + 2NaOH \rightarrow Na_2O.3SiO_2 + H_2O$$

$$3SiO_2 + 2NaHCO_3 \rightarrow Na_2O.3SiO_2 + H_2O + 2CO_2$$

That is, in the case where the weight contents ratio of the alkaline metal compounds represented by Na element (hereinafter referred to as Na-density) relative to the amount of the fluidizing medium ($SiO_2$) is below approximately 0.5% (as in the usual type of municipal waste), the maximum temperature should be 800° C., while in the case where the Na density in the fluidizing medium is as high as 1% such as in waste slurries or industrial waste which have a high content of alkaline-metal compounds, the temperature is to be maintained below 750° C., which is the highest possible limit for keeping the operation at a safe level.

Incidentally, it is possible to incinerate waste containing alkaline-metal compounds, etc. in the fluidized bed incinerator by adding certain kinds of agents, for example, kaoline which suppress the potential for fusion of the silica sand in order to suppress the reaction between the sand and $Na_2CO_3$ or NaOH. However, there is still a limitation in regard to the feeding density of alkaline-metal compounds, etc. in the waste relative to time and relative to the amount of fluidizing sand held within the incinerator, and fluidization stops even if the amount of suppressing agent is increased whenever the feeding density goes beyond the limit.

On conducting tests by use of an experimental furnace of the fluidized bed type, the Na density within the fluidizing sand was approximately 0.6–1.8% when fluidization of the fluidizing medium ($SiO_2$) stopped at approximately 800° C. due to the presence of alkaline-metal compounds in the combustibles, the variation being dependent on the kinds of alkaline-metal compounds and the fusion suppressing agents used.

Also, addition of a fusion suppressing agent is not effective in a case where the grain size of the agent is fine as this causes scattering of the agent at the time it is being charged into the incinerator, but it is also disadvantageous in that addition of the agent is expensive and increases the load that will be applied on the ensuing facilities. Consequently addition of such agents is not a powerful countermeasure capable of overcoming the problem induced by the presence of alkaline-metal compounds.

According to the test results obtained in the experimental furnace, the alkaline-metal compounds within the combustibles rae almost totally in the state of dust and mist in the exhaust gas when incineration is performed within the fluidized bed and discharged from the furnace. Thus the amount of alkaline-metal compounds remaining (accumulating) in the fluidizing sand is small and the amount of alkaline-metal compound remaining in the sand is mostly dependent on the amount of alkaline-metal compounds supplied together with the combustibles. Incidentally, not only is Na or K selectively trapped as constituents remaining in the sand but also other constituents, for example Fe and Ca, etc. may be present in a ratio corresponding to the ratio of the constituents as charged.

Because of the complex reaction behavior discussed above, in a case where waste containing alkaline-metal (Na, K) compounds is incinerated in the fluidized bed, a tentative standard for limitation of the processable density of (Na +K) is set as 1.0%/H with respect to the Na load (K also being converted to Na equivalent values) relative to the fluidizing sand. In fact, the acceptable density for Na and K may somewhat vary depending on differences in the forms of the alkaline-metal compounds ($Na_2CO_3$, NaOH, NaCl, $Na_2SO_4$; or $K_2CO_3$, KOH, KCl, $K_2SO_4$, etc.) but, since it is assumed that industrial waste includes a variety of alkaline-metal compounds due to its nature, the value 1.0%/H is set as Total-Na.

It is known that, in a case where plural kinds of alkaline-metal compounds co-exist, a co-melting point thereof is derived and such mixture melts at that point which is lower than the melting point of each individual alkalinemetal compound. This matter is of great importance and care must be taken in controlling the operation of a fluidized bed. In particular, amongst the alkaline-metal compounds contained in waste, $Na_2CO_3$ or NaOH, etc. couple with the fluidizing sand chemically to produce sodium silicate or the like and, thus, care must without fail be taken with respect to controlling the amount of Na and K charged, as well as the temperature of the fluidized bed.

Under the circumstances discussed above, it has been required, for example, to introduce water into the fluidized bed or to recover thermal energy therefrom in order to keep the temperature of the fluidized bed below 800° C. in the case where, for example, many plastics are contained in the waste and the thermal energy generated therefrom is large enough to raise the temperature of the fluidized bed beyond 800° C.

Further, from the viewpoint of the combustion rate within the bed representing the ratio of incineration thermal energy to be returned to the fluidizing medium, silica sand generally belongs to the category of substances having a relatively low thermal conductivity since the thermal conductivity of the silica sand is low and is approximately 1.2 (800° C.) Kcal/mh° C.

There have therefore been occasions when the temperature of the fluidized bed cannot be maintained at a high level when the thermal energy derived from the waste is low.

Incidentally, if the combustion rate within the bed is low, the incineration ratio of the waste in the freeboard is increased and the mixing with the air therein is degraded such as to lower the total combustion ratio whereby the amount of harmful substances exhausted is increased.

On the other hand, some of the several kinds of waste slurries, waste liquids and industrial waste, etc. discharged from certain kinds of factories may involve many alkaline-metal compounds in an amount larger than that contained in municipal waste or waste plastics and may further include phosphide and vanadium compounds.

With respect to the temperature of a fluidized bed adapted to incinerate waste containing a large amount of the compounds referred to above, there is a certain limitation which corresponds to the content of those compounds. Depending on the kind of compounds concerned, it may be impossible to raise the temperature range beyond the 600° C. level that is required for the incinerating process or it may be necessary to control and regulate the amount of alkaline-metal, phosphorus or vanadium within the fluidizing medium at a level below 1% by weight in a manner similar to the cases explained above, this being done by charging the waste gradually.

That is, particularly in the case where a large amount of alkaline-metal compounds, phosphides or vanadium compounds is contained within the combustibles, they or their oxides, etc. physically or chemically combine with the silica sand that serves as a fluidizing medium so that it exhibits a clinker. state which causes the bed to become inoperable. It has therefore been necessary to control the temperature of the fluidized bed below 600° C. by decreasing the amount of comtustibles charged or introducing water into the fluidized bed.

However, incineration of waste by the fluidized bed has in most cases been conducted at an incineration temperature in the range of 600–800° C. and, in the case where a large amount of alkaline-metal compounds is included within the waste, the temperature control referred to above has been essential, which has meant that such operations have in practice been impossible.

The present invention is directed to the incineration and disposal of several kinds of wastes by employing a fluidized bed and provides a method for processing the waste in a fluidized bed wherein grains of $TiO_2$, or $Al_2O_3$ are employed, instead of the silica sand conventionally used as a fluidizing medium, whenever the combustibles to be disposed of contain relatively large amounts of alkalinemetal compounds, phosphides or vanadium compounds, and a smooth incineration process is thus made possible even when the temperature in the fluidized bed is beyond 600° C.

DISCLOSURE OF INVENTION

In regard to the field of methods of incinerating all kinds of waste such as municipal waste, waste plastics, industrial waste, various kinds of slurries and waste liquids, coal, petroleum coke, and bark, etc. which utilize a fluidized bed wherein silica sand is conventionally employed as a fluidizing medium, the present invention provides a method of incinerating several kinds of combustibles in a fluidized bed with the use of a grain material comprising $TiO_2$ or $Al_2O_3$ as the primary component of the fluidizing medium, instead of the silica sand that is conventionally employed, the present invention thereby making it possible to effect smooth incineration even at temperatures beyond 600° C., to maintain the temperature in the fluidized bed as high as 800° C. or more than that temperature and to prevent the generation of harmful substances such as dioxin with certainty.

Hereinafter, the present invention will be explained in detail.

Before conducting tests using the experimental furnace, tests were performed in the laboratory on several kinds of materials in the grain state in order to seek a suitable fluidizing medium. The tests were performed by adding several kinds of alkaline-metal compounds, etc. to several kinds of grain materials (salts being dissolved in water and the water content being evaporated after mixing) with the mixture being calcinated in a ceramic case within a muffle furnace for one and a half hours and thereafter being allowed to cool alone. The cooled substances were withdrawn from the furnace and examined with respect to the degree of reaction and some of the results are shown in Table 1.

Incidentally, it was found that the differences in the results accounted for by the difference between the same kinds of salts being derived from either Na or K were negligible and these results were almost the same. Accordingly, Na-compounds are listed as being representative of both kinds.

Also, some tests of the same kind using $P_2O_5$ and $V_2O_5$ are shown in Table 2.

TABLE 1

| Fluidizing medium | Added Na-compounds | Na density wt % | Calcining temperature °C. | Judgement | Remarks |
|---|---|---|---|---|---|
| α-SiC | $Na_2CO_3$ | 5% | 830 | 5 | grain size approx. 1 mm |
| " | NaOH | " | " | 5 | grain size approx. 1 mm |
| " | NaCl | " | " | 5 | grain size approx. 1 mm |
| " | $Na_2SO_4$ | " | " | 2 | grain size approx. 1 mm |
| β-SiC | $Na_2CO_3$ | 5% | 830 | 3 | grain size approx. 2 mm |
| " | NaOH | " | " | 4 | grain size approx. 2 mm |
| " | NaCl | " | " | 4 | grain size approx. 2 mm |
| " | $Na_2SO_4$ | " | " | 3 | grain size approx. 2 mm |
| $Al_2O_3$ | $Na_2CO_3$ | 5% | 750 | 0 | grain size 0.71–1.68 mm |
| " | NaOH | " | " | 0 | grain size 0.71–1.68 mm |
| " | NaCl | " | " | 0 | grain size 0.71–1.68 mm |
| " | $Na_2SO_4$ | " | " | 0 | grain size 0.71–1.68 mm |
| $Al_2O_3$ | $Na_2CO_3$ | " | 830 | 1 | grain size 0.71–1.68 mm |
| " | NaOH | " | " | 1 | grain size 0.71–1.68 mm |
| " | NaCl | " | " | 4 | grain size 0.71–1.68 mm |
| " | $Na_2SO_4$ | " | " | 2 | grain size 0.71–1.68 mm |
| $Al_2O_3$ | $Na_2CO_3$ | " | 950 | 3 | grain size 0.71–1.68 mm |
| " | NaOH | " | " | 3 | grain size 0.71–1.68 mm |
| " | NaCl | " | " | 4 | grain size 0.71–1.68 mm |
| " | $Na_2SO_4$ | " | " | 5 | grain size 0.71–1.68 mm |
| $TiO_2$ | $Na_2CO_3$ | 5% | 750 | 0 | grain size approx. 2 mm |
| " | NaOH | " | " | 0 | grain size approx. 2 mm |
| " | NaCl | " | " | 0 | grain size approx. 2 mm |
| " | $Na_2SO_4$ | " | " | 0 | grain size approx. 2 mm |
| $TiO_2$ | $Na_2CO_3$ | " | 830 | 0 | grain size approx. 2 mm |
| " | NaOH | " | " | 0 | grain size approx. 2 mm |
| " | NaCl | " | " | 0 | grain size approx. 2 mm |
| " | $Na_2SO_4$ | " | " | 0 | grain size approx. 2 mm |
| $TiO_2$ | $Na_2CO_3$ | " | 950 | 0 | grain size approx. 2 mm |
| " | NaOH | " | " | 0 | grain size approx. 2 mm |
| " | NaCl | " | " | 0 | grain size approx. 2 mm |
| " | $Na_2SO_4$ | " | " | 0 | grain size approx. 2 mm |

TABLE 2

| Fluidizing medium | Added material | Density for P or V wt % | Calcining temperature °C. | Judgement | Remarks |
|---|---|---|---|---|---|
| $SiO_2$ | $P_2O_5$ | 5% | 750 | 3 | grain size approx. 1 mm |
| " | " | " | 830 | 3 | grain size approx. 1 mm |
| " | " | " | 950 | 4 | grain size approx. 1 mm |
| $TiO_2$ | $P_2O_5$ | 5% | 750 | 0 | grain size approx. 0.3 mm |
| " | " | " | 830 | 0 | grain size approx. 0.3 mm |
| " | " | " | 950 | 0 | grain size approx. 0.3 mm |
| $SiO_2$ | $V_2O_5$ | 5% | 750 | 4 | grain size approx. 1 mm |
| " | " | " | 830 | 5 | grain size approx. 1 mm |
| " | " | " | 950 | 5 | grain size approx. 1 mm |
| $TiO_2$ | $V_2O_5$ | 5% | 750 | 0 | grain size approx. 0.3 mm |
| " | " | " | 830 | 0 | grain size approx. 0.3 mm |
| " | " | " | 950 | 0 | grain size approx. 0.3 mm |

Standard for Judgement in Tables 1 and 2:
6: a completely fused state, adhered together uniformly as a whole, the shape thereof not being broken even when strongly pushed by a stick;
4: locally fused and adhered and not separable until pushed by a stick;
2: locally forming an adhered lump but easily stripped off;
0: grain materials are completely independent and not adhered together.

Remarks 1:
Choice, for example, of the index value 3 in the standard for judgement means that "it is judged to have a degree of adhesion which is in the intermediate state between the indexes 2 and 4". This interpretation is also to be applied to the indexes 1 and 5.

Remarks 2:
Melting Points of Several Kinds of Alkaline-Metal Compounds, etc.

| | |
|---|---|
| $Na_2CO_3$ | 851° C. |
| NaOH | 318° C. |
| NaCl | 800° C. |
| $Na_2SO_4$ | 884° C. |
| $Na_2CO_3$ + NaCl + $Na_2SO_4$ | 612° C. |
| $P_2O_5$ | 563° C. |
| $V_2O_5$ | 690° C. |

The above tests were not ones wherein the medium was actually fluidized and, thus, the results may be different from those achieved with actual operations; however, judgement as to the trends regarding whether the tested medium is suitable for use or not would be applicable. (Since the conditions under actual fluidization may not be severe, the above judgement may be made with some allowance for safety.)

According to the above results of tests conducted in the laboratory, $Al_2O_3$ and $TiO_2$ were judged as actually usable. These two kinds of media were subjected to tests using an experimental furnace and it was found that a stable operation was possible for $Al_2O_3$ up to a level of approximately 800° C. with respect to the fluidizing medium temperature at a Na density of approximately 5%, and for $TiO_2$ even in the range of 800–1000° C. with respect to the fluidizing medium temperature at a Na density of over 5%.

Accordingly when a granular material comprising $TiO_2$ as a primary component is used as a fluidizing medium, it becomes possible to easily perform and continue a stable operation for disposing of several kinds of waste without affecting the fluidizing medium even with the fluidized bed temperature maintained at over 700° C., and preferably in the range of 800° C.–1000° C.

On the other hand, regarding the incineration disposal of waste slurries and waste liquids which don't generate a large amount of harmful substances, particularly such substances as dioxin, etc., but contain phosphides and vanadium compounds in large amounts which has previously meant that they cannot be incinerated in a fluidized bed, it becomes possible when a granular material comprising $TiO_2$ or $Al_2O_3$ is employed as the primary component of a fluidizing medium to dispose of these substances by incineration in a fluidized bed without the need to control the fluidized bed at a low temperature and yet maintaining a stable and trouble-free fluidized state without the drawback of producing clinkers, this being possible even if the fluidized bed temperature is kept at over 600° C. or preferably in the range of 600–800° C.

Similar tests were also conducted using several kinds of $TiO_2$ of varying purity and it was found that some of them, even those having high purity, were fused and caused to adhere due to the presence of alkaline-metal compounds. Accordingly, the inventors made further investigations and conducted tests aiming at elucidating the point that such phenomena are related to the purity of $TiO_2$ and the kinds and amounts of impurities included, and discovered the following. That is, among the metal elements contained in the granular materials of $TiO_2$, the content of Li, B, Na, Al, Si, K, Ca, V, Cr, Co, Cu and Pb was found to be a factor which relates to the reaction with alkaline-metal compounds, phosphides or vanadium compounds particularly closely. Thus the most desirable composition of the fluidizing medium relating to $TiO_2$ for use in the present invention became clear.

The allowable amounts of impurities that may be included within the granular materials of $TiO_2$ is, based on the amounts as individual elements, required to be below 3 wt% for Li, 2 wt% for B, 0.5 wt% for Na, 2 wt% for Al, 2 wt% for Si, 1 wt% for K, 2 wt% for Ca, 2 wt% for V, 3 wt% for Cr, 3 wt% for Co, 3 wt% for Cu and 3 wt% for Pb, respectively.

The elements which exist in the composition as impurities apart from $TiO_2$—such as Li, B, Na, Al, Si, K, Ca, V, Cr, Co, Cu and Pb—are generally in the form of oxides in the boundary regions of crystal grains and serve to increase the reaction with the alkaline-metal compounds, phosphides such as $P_2O_5$, and vanadium compounds such as $V_2O_5$ existing in the fluidizing medium. Therefore, if the impurity elements are included in an amount beyond the values noted above within a fluidizing medium, it would be quite difficult to use such medium as the fluidizing medium according to the present invention since the medium must not cause the fusing and adhering phenomenon which the present invention intends to avoid. Among all the impurity elements noted above, the tendency of the above phenomenon to be caused is particularly strengthened if Na is present over 0.5 wt% and that is also true if K is present over 1 wt%. Also, such tendency is observed if the amount included is beyond 2% for Al, B, Si, Ca and V, respectively and a strong tendency is observed if the amount included is beyond 3% for Li, Cr, Co, Cu and Pb, respectively.

It is necessary that the $TiO_2$ of which the fluidizing medium is composed occupies more than 85 wt% thereof. The reason for this is that, if it is less than 85 wt%, the granular materials easily react with alkaline-metal compounds existing in the fluidizing medium to fuse and adhere, thereby degrading the fluidizing effect.

The relationship between the purity and the allowable amount of impurity elements is an indispensable requirement for both. For instance, even if $TiO_2$ is present over 95%, the granular materials exhibit a tendency to fuse and adhere if the content of anyone of the impurity elements is beyond the allowable value specified above.

In the case where the fluidizing medium is composed to be non-fusing and non-adhering, the fluidized bed as a whole will not become as fused and adhered such as to obstruct fluidization even if some $SiO_2$, etc. is contained within the combustibles. As to the incineration of combustibles such as waste slurries in which an amount of mixed $SiO_2$, etc. is small, there is little chance that the amount of $SiO_2$ in the fluidizing medium would be increased by accumulation. In the case of municipal waste containing incombustibles such as $SiO_2$, mutual fusing of $SiO_2$ is prevented by the presence of fluidizing medium of a type which does not cause fusing and adhering around the $SiO_2$ that has the tendency to chemically and physically cause fusion and adherence.

According to the test conducted at a high temperature by mixing $SiO_2$ and alkaline-metal compounds with the granular materials comprising $TiO_2$ as a primary component, it was found that, while it depends to some extent on the kinds of compounds involved, the fluidized bed becomes viscous when the content of $SiO_2$ was approximately 10–20% with a Na density of 5% and the temperature at 950° C., while the fluidization was not obstructed if the temperature was held under 800° C. even when the Na density was 5% and the content of $SiO_2$ was in the order of 20%.

That is, in cases where waste slurries containing relatively large amounts of Na are to be incinerated, there is no problem regarding the presence of a mixture of $SiO_2$, etc. and the incineration may be performed with the fluidized bed temperature maintained at 600–800° C. In cases where municipal waste or the like is to be incinerated, the incineration can be performed continuously without trouble even with the fluidized bed temperature maintained at 800–1000° C. because the content of Na in the municipal waste is below 1% at most, a part of the $SiO_2$, etc. mixed therewith is scattered as dust, and the other part thereof is withdrawn as incombustibles together with the fluidizing medium from the furnace bottom in such manner as is commonly practiced and only the fluidizing medium is recycled into the furnace after being sorted by means of a vibrating sieve. Thus no $SiO_2$ is accumulated in the furnace.

In cases where $SiO_2$ in the grain state and of a size which is almost equivalent to that of the fluidizing medium is contained in a particularly large amount within the combustibles (this is not usually the case), a part of the fluidizing medium is withdrawn and a fresh fluidizing medium is supplemented so that the content of the $SiO_2$ grains does not go beyond the allowable level.

As to the $TiO_2$ fluidizing medium to be used, the crystal construction thereof may either be a rutile-type or anatase type; however, the rutile-type is generally preferable because its hardness is high.

On the other hand, there are several countermeasures that can be taken for reducing nitrogen compounds (hereinafter referred to as $NO_x$) generated during the incineration stage and a representative one is a denitration using a catalyst. However, it has been common knowledge that denitration using a catalyst is performed within a temperature range in the order of 300–400° C. with the addition of ammonia so that there has been almost no conception of performing denitration using a catalyst in a high temperature zone.

Also, NO is active in any reactions of decomposition, oxidization or reduction, and the decomposition of NO to $N_2$ and $O_2$ is said to be the most ideal reaction from the viewpoint of removal of $NO_x$ and the reaction available in respect of thermodynamics. While many catalyst systems have been examined. It is said that there has been no practical catalyst available for promoting such a reaction under ordinary conditions.

The inventors found that anatase-type $TiO_2$ or $\alpha$-$Al_2O_3$ with respect to its crystal construction has low activity at the commonly used temperature range of 300–400° C. and also has a low efficiency with respect to its effect as a catalyst if it is used alone, though it becomes highly active at high temperatures. So, the inventors conceived that the granular material of anatase-type $TiO_2$ or $\alpha$-$Al_2O_3$ could be used as the fluidizing medium as well as the catalyst for denitration so as to make it possible to incinerate the combustibles or heat treat them within the fluidized bed and simultaneously denitrate the same.

Also, the thermal conductivity is approximately 7 Kcal/mh° C. for both $TiO_2$ and $Al_2O_3$, which is in the order of 6 times that of silica sand. Accordingly, it is possible to rapidly transmit the thermal energy generated in the fluidized bed to the fluidizing medium if it is $TiO_2$ or $Al_2O_3$ so as to raise the combustion ratio within the bed and maintain the fluidized bed at a high temperature. Therefore, the combustibles can be almost completely incinerated at the stage below the free-board.

Also, since the incinerator is maintained at a high temperature, decomposition of the harmful substances is promoted and thus the required ratio of air to be fed into the incinerator for combustion is small and the ratio may ordinarily be enough if it is more than 1.3. Therefore, it is possible to arrange the exhaust gas disposal system downstream of the incinerator in a compact manner.

BEST MODE FOR PRACTICING INVENTION

In a case where the combustibles containing a relatively large amount of alkaline-metal compounds were processed for incineration, it was possible to perform a stable operation using a conventional incinerator in which only its fluidizing medium is replaced with granular material comprising $TiO_2$ or $Al_2O_3$ as a primary component and maintaining the temperature of the fluidizing medium within the range of 600–800° C. and the temperature of the freeboard portion at around 900° C.

Figure 1:
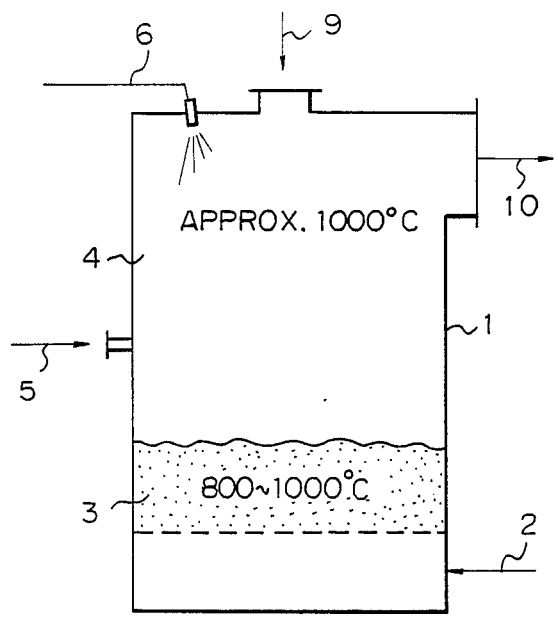
FIG. 1 is a drawing showing an example of a high temperature fluidized bed.

In order to suppress the generation of organic chlorides such as dioxin, etc. when municipal waste containing in a mixed state plastics or the like is to be incinerated, a method is employed for maintaining the temperature at 800–1000° C. in the high temperature fluidized bed using a granular material primarily comprising $TiO_2$ as a fluidizing medium 3, which is fluidized by air 2 within an incinerator 1 as shown in FIG. 1, and to control the temperature of a free-board portion 4 under approximately 1000° C., which is lower than the fusion temperature of flying ash, by injecting secondary air 5, spraying water 6 or recovering thermal energy with the use of a radiation heat boiler (not shown) or the like.

Figure 2:
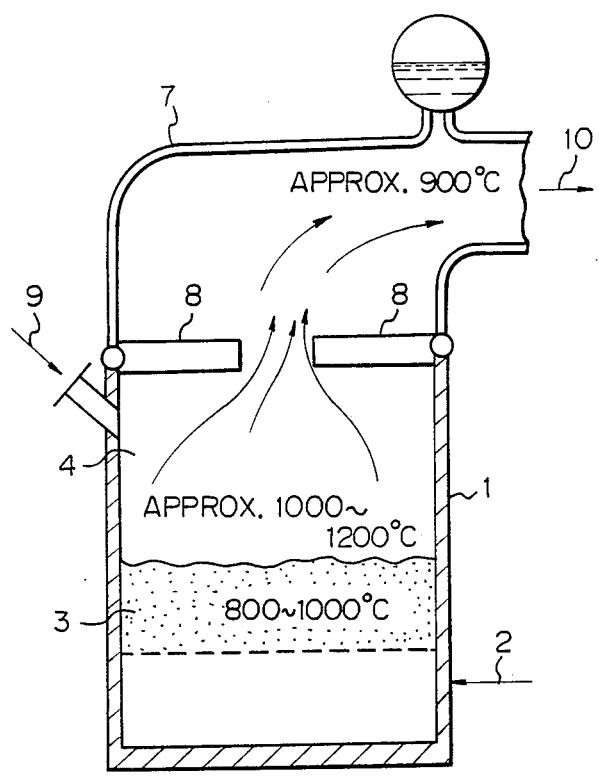
FIG. 2 is a drawing showing another example of a high temperature fluidized bed wherein the temperature of its free-board is arranged to be still higher.

Further, in order to more completely decompose harmful substances such as PCB or cyan, etc. mixed into the combustibles, other than the organic chlorides such as dioxin or the like, another method is employed wherein a high temperature zone is arranged to have a temperature range of approximately 1000–1200° C. in the free-board portion as shown in FIG. 2, this allowing these substances to stay in that zone for several seconds; and then to forward them after they have completely decomposed to a boiler portion or the like having a radiation thermal conducting surface means which instantaneously lower the temperature to approximately 900° C. by radiation heat transfer without causing such troubles as adhering of fused dust to the thermal conducting surfaces; and thence to an exhaust gas processing means disposed downstream.

In FIG. 2, reference 8 is a plate for preventing any temperature drop in the incinerating portion due to heat radiation at the thermal conducting surface of a radiation heat conducting boiler 7, 9 denotes combustibles and 10 exhaust gas.

Incidentally, although only one embodiment for making the temperature of the free-board portion high is schematically shown in FIG. 2, the type of incinerator employed is not limited to that illustrated and it is also possible to raise the temperature of the free-board portion to 1000–1200° C. in the incinerator shown in FIG. 1.

In a case where ordinary municipal waste is incinerated, it is almost completely satisfactory to employ the method shown in FIG. 1 as a countermeasure for processing organic chlorides such as dioxin, etc.

If a diffusing nozzle for fluidizing air (incinerating air) is made of ceramics, it can be constructed to withstand for a long time use under high temperatures even if the air is pre-heated to an extensively high temperature to effect high temperature incineration for the purpose of improving the balance of incoming and outgoing thermal energy so that the temperature of the incinerator can be economically kept high while pre-heating the incinerating air by means of the exhaust gas together with an improvement in the incoming and outgoing thermal energy balance of the incinerator.

As to the grain size of the fluidizing medium, it is in general acceptable to arrange the size to be in the order of 0.4–2.0 mm; however, it may be arranged to be in the order of 0.2 mm by providing a cyclone type dust collecting plate at a portion around an exhaust opening of the free-board or by returning the grains collected at a gas cooling chamber or a boiler utilizing waste thermal energy which is usually disposed at the portion around the opening for the exhaust gas.

What is most important in using $TiO_2$ grain material as a fluidizing medium is the purity of $TiO_2$ (more than 85%) and other compositions constituting the grain must be regulated such that each of the elements concerned is within the allowable range as noted hereinbefore. That is, even in the case, for example, where the content of $TiO_2$ is more than 95%, the fluidizing medium suffers from fusion and adhering if anyone of the elements is contained above the allowable limit therefor.

Also, if the granular material employed as a fluidizing medium is composed as one which does not suffer from fusion or adhering, the fluidization thereof may not deteriorate due to fusing and adhering as a whole even if $SiO_2$ is contained to some extent in the combustibles.

Ilumenite which has a low purity of $TiO_2$ is naturally fused and adhered and some natural rutiles tested which have a high (more than 95% $TiO_2$) purity of $TiO_2$ also experienced fusion and adhering. It was found that synthetic rutile with the impurities regulated as above was the most satisfactory form of $TiO_2$ fluidizing medium.

Regarding the form of the grain, it may either be a synthesized type of grain, or granulated or crushed after sintering or agglomeration.

On the other hand, in a case where the denitration is to be simultaneously performed, if a granular material comprising anatase-type $TiO_2$ or $\alpha$-$Al_2O_3$ as a primary component is charged as a fluidizing medium at the bottom of the fluidized bed and the fluidized thermal reaction is effected while maintaining the fluidized bed temperature at over approximately 800° C. by fluidizing and incinerating air blown from the bottom of the incinerator, $NO_x$ generated due to the incineration within the fluidized bed is decomposed under the catalysis of the granular material whereby the denitration is effected simultaneously with the incineration. The decomposing reaction at this time is

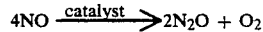

and there may partially be an oxidation as

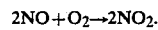

According to the results of the experiments, the granular material of anatase-type $TiO_2$ exhibited a denitration effect at temperatures over approximately 700° C. and it presented the highest denitrating efficiency at a temperature of approximately 900° C. An example of these results is shown in FIG. 3.

Figure 4:
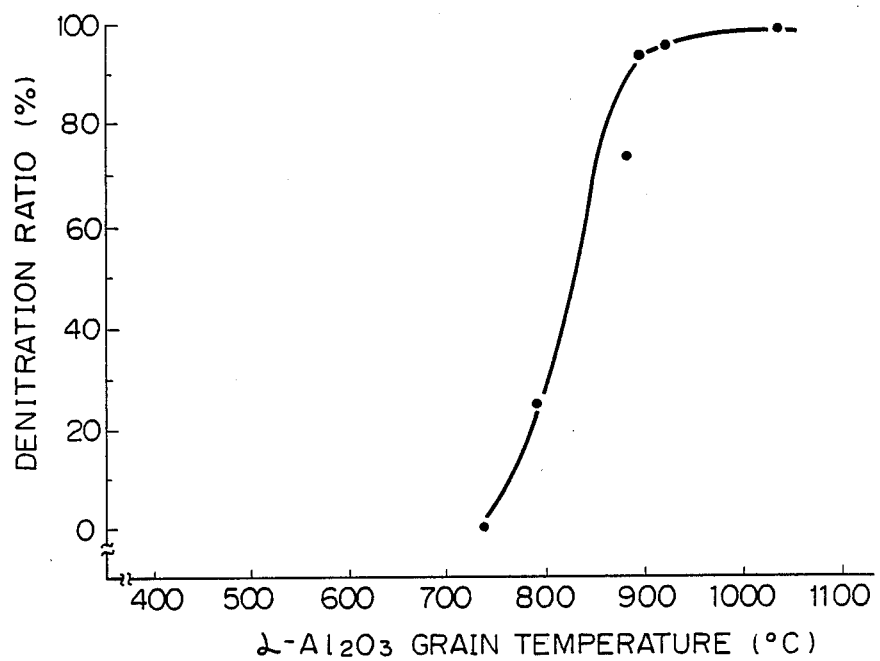

As to the granular material of $\alpha$-$Al_2O_3$, it exhibits a denitrating effect at a temperature over approximately 800° C. and the effect is highest at a temperature approximately in the range of 900–1000° C. An example of these results is shown in FIG. 4.

Incidentally, the experiments mentioned above were conducted by using a clinker granular material of anatase-type $TiO_2$ and a clinker granular material of $\alpha$-$Al_2O_3$ (fused alumina) and the NO density at the inlet of the reactor was 130–200 ppm.

Figure 3:
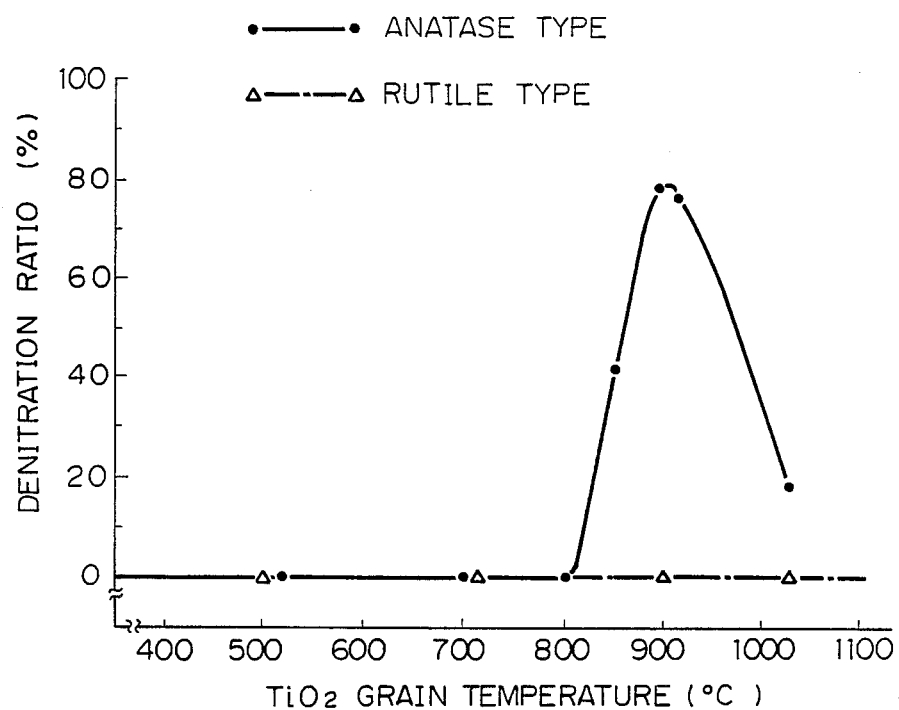
FIGS. 3 and 4 are graphs indicating the relationship between the temperature of the fluidizing medium and the denitration ratio when the $TiO_2$ grains and $Al_2O_3$ grains are employed as a fluidizing medium, respectively.

In FIG. 3, the granular material of either anatase-type or rutile-type does not show any activated mode until the temperature is raised to 800° C. without the presence of $NH_3$, but the granular material of anatase-type $TiO_2$ exhibits a highly activated mode providing a high denitrating efficiency even without the presence of $NH_3$ at a temperature of approximately 800–1000° C.

With respect to the anatase-type $TiO_2$, its activated mode shows a sudden drop at a temperature over approximately 1000° C. and this is due to the dislocation of the crystal structure from the anatase-type to the rutile-type at such temperatures over approximately 1000° C.

According to the experiments, if the denitration is effected at a temperature of 900° C. even for a long time with use of 100% anatase-type $TiO_2$, the amount of dislocation to the rutile-type is small (the dislocation ratio to the rutile-type being approximately 1% after 27 hours) but it is almost completely dislocated to the rutile-type after a short time at a temperature of 1030° C. (the dislocation ratio to the rutile-type being approximately 96% after 3 hours).

Accordingly, even with the use of the anatase-type material, it is not practical to use it at temperatures over 1000° C. and the operation should be conducted at a temperature within the range of 800–1000° C.

Incidentally, it is also possible to arrange the fluidizing medium without making the whole of it a granular material comprising anatase-type $TiO_2$ or $\alpha$-$Al_2O_3$ as a primary composition and instead to mix it with other ordinary fluidizing media such as $SiO_2$, etc. when preparing the fluidized bed. That is, in a case where the combustibles contain alkaline-metal compounds in an amount beyond a certain value, a granular material primarily comprising anatase-type $TiO_2$ is employed as a fluidizing medium because the temperature is raised above the fusion and adhering temperature. In other cases such as the conventional fluidized reactor, it is not necessary to arrange all the fluidizing medium as anatase-type $TiO_2$ or $\alpha$-$Al_2O_3$ granular material.

Summarizing the above, the fluidizing medium may be classified as follows.

Suitable fluidizing medium where the combustibles contain hardly any alkaline-metal compounds, etc.
Denitration is required . . .
anatase-type $TiO_2$ or $\alpha$-$Al_2O_3$;
Suitable fluidizing medium where the combustibles contain alkaline-metal compounds, etc. in an amount beyond a certain value.
Denitration is unnecessary . . .
rutile-type $TiO_2$ (temperature range 600–1000° C.);
$Al_2O_3$ (temperature range 600–800° C.);
Denitration is required . . . anatase-type $TiO_2$.

Investigations have recently been made as to use of a fluidized bed type incinerator for solely incinerating fuels such as coal, petroleum cokes and bark, etc. However, according to the present invention in which a granular material primarily comprising $TiO_2$ or $Al_2O_3$ is employed as a fluidizing medium, the fluidizing medium itself can withstand high temperatures without fusing and adhering so that the incinerator can be expected to enjoy a stable operation.

In cases where a granular material primarily comprising anatase-type $TiO_2$ or $\alpha$-$Al_2O_3$ is employed as a fluidizing medium, denitrating activation is made high in the temperature range of 850–900° C. wherein the amount of $SO_x$ generated by the incineration of sulphur contained in the fuels is small and the denitration is effected in such a manner that a great contribution is made to maintaining a good environment.

EFFECTS OF INVENTION

As discussed in the foregoing, the following matters can be expected in the present invention.

(1) If alkaline-metal compounds, phosphides, or vanadium compounds are contained in the combustibles in an amount beyond a certain value, there is no problem regarding fusion of the fluidizing medium and the temperature of the fluidized bed can be kept high as well as the smooth fluidizing state being maintained.

That is, the combustibles which cannot be incinerated in the conventional fluidized bed can be disposed of.

(2) Because the temperature of the fluidized bed can be maintained at a still higher level, generation of organic chlorides such as PCDD, PCDF and benzpyrene, etc. is suppressed and the small amount of harmful substances generated, if any, can be easily decomposed.

(3) By maintaining the temperature of the fluidized bed at a high level similar to the case (2) above, the granular material of anatase-type $TiO_2$ or $\alpha\text{-}Al_2O_3$ can serve as the fluidizing medium as well as the catalyst so that nitrogen oxide generated during the incineration process can be decomposed.

Also, as a supplementary effect, a temperature controlling operation such as spraying water for suppressing the temperature so that it remains below a certain value becomes unnecessary and thus it is possible to avoid energy loss occurring due to the latent heat of vaporization caused by spraying water and to prevent the volume of exhaust gas from becoming large, whereby a processing system for saving energy and disposing of the exhaust gas can be made compact.

Utility in Application to Industry

As explained above, the present invention can, from the macroscopic standpoint, be utilized in three fields. That is, the first one is the field of waste such as several kinds of waste slurry and waste liquids containing alkaline-metal compounds, etc. in an amount beyond a certain value; the second one is the field of municipal waste, waste plastics and industrial waste, etc.; and the third one is the field of fluidized bed boilers wherein coal, petroleum cokes and bark, etc. are used as fuels.

As to the coal, etc. used in the third field, it is preferable that the method according to the present invention exhibits denitrating activation in the temperature range of approximately 850–900° C. which is the temperature zone wherein the generation of $SO_x$ due to the sulphur content in the fuel is at its minimum and, thus, a great contribution is made to the maintenance of a good environment.

We claim:

1. A method of incinerating combustibles characterized in that several kinds of combustibles are incinerated in a fluidized bed type incinerator using a granular material and/or granular sintered material as a primary fluidizing medium, said granular material and/or granular sintered material comprising at least 85% $TiO_2$ as its primary component.

2. A method of incinerating combustibles as claimed in claim 1 wherein said primary fluidizing medium is a granular material and/or granular sintered material prepared from at least 85% $TiO_2$ by weight and the rest of the medium is composed of compounds comprising elements in amounts within the following ranges, respectively,

| | | | |
|---|---|---|---|
| Li ≦ 3 wt %; | B ≦ 2 wt %; | | Na ≦ 0.5 wt %; |
| Al ≦ 2 wt %; | Si ≦ 2 wt %; | | K ≦ 1 wt %; |
| Ca ≦ 2 wt %; | V ≦ 2 wt %; | | Cr ≦ 3 wt %; |
| Co ≦ 3 wt %; | Cu ≦ 3 wt %; | and | Pb ≦ 3 wt %. |

3. A method of incinerating combustibles as claimed in claim 2 wherein a granular material comprising $TiO_2$ whose crystal structure is of anatase-type as its primary component is employed as a fluidizing medium constituting said fluidized bed.

4. A. method of incinerating combustibles as claimed in claim 1, wherein several kinds of combustibles are incinerated with a fluidized bed comprising said fluidizing medium maintained at a high temperature above 600° C.

5. A method cf incinerating combustibles as claimed in claim 4 wherein several kinds of combustibles are incinerated with the fluidized bed comprising said fluidizing medium maintained at a temperature within the range of 800° C. –1000° C.

6. A method of incinerating combustibles as claimed in claim 1 wherein several kinds of combustibles are incinerated, said combustibles containing alkaline-metal compounds, phosphides and/or vanadium compounds.

7. A method of incinerating combustibles as claimed in claim 1 wherein the combustibles are municipal waste and/or waste plastics.

8. A method of incinerating combustibles as claimed in claim 1 wherein a granular material comprising $TiO_2$ whose crystal structure is of anatase-type as its primary component is employed as a fluidizing medium constituting said fluidized bed.

* * * * *